Figure 1:
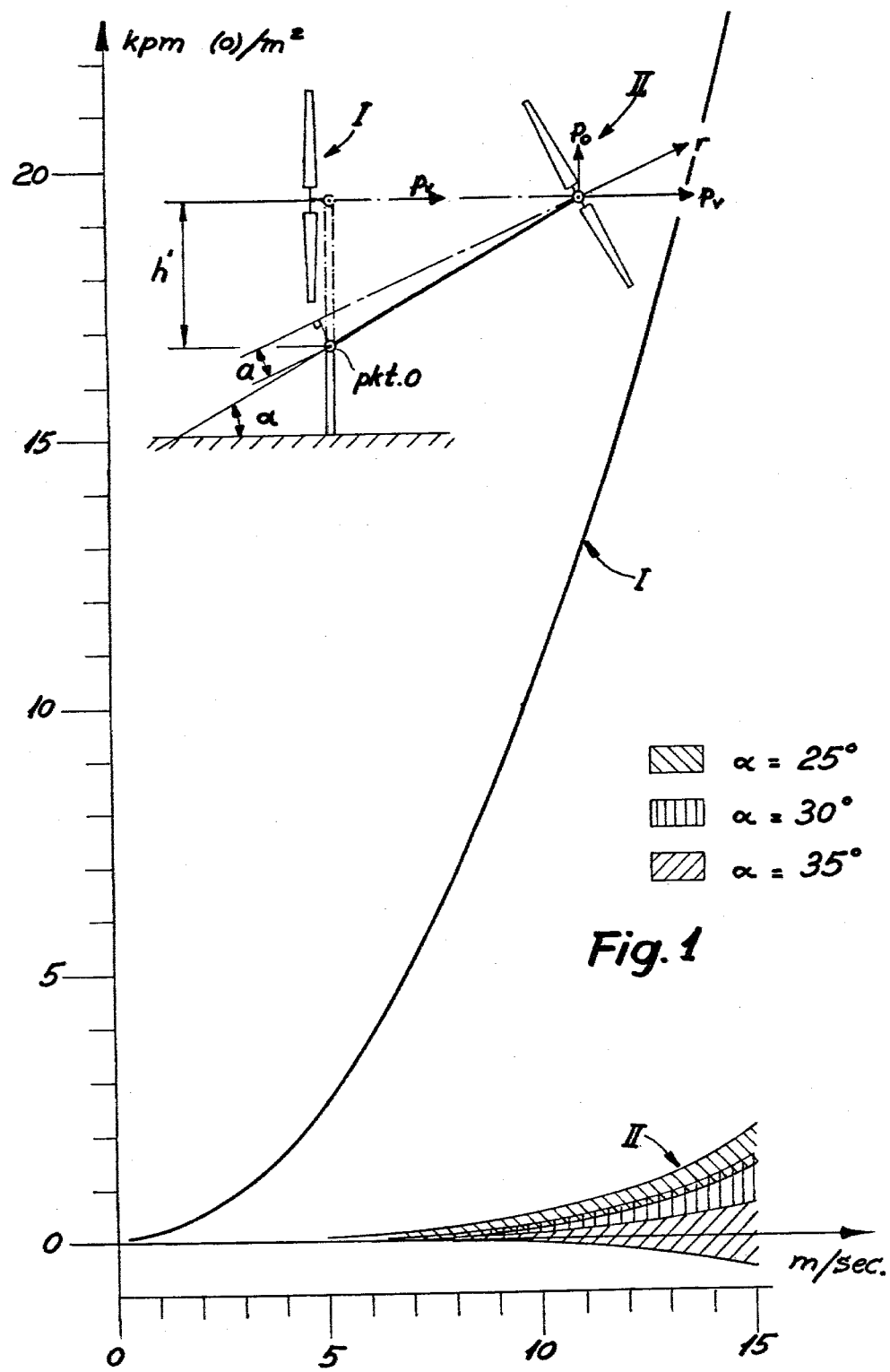

United States Patent [19]

Poulsen

[11] 4,242,043
[45] Dec. 30, 1980

[54] WINDMILL

[76] Inventor: Peder U. Poulsen, Strandvejen 666, DK-2930 Klampenborg, Denmark

[21] Appl. No.: 926,566

[22] Filed: Jul. 20, 1978

[30] Foreign Application Priority Data

Jul. 22, 1977 [DK] Denmark ............... 3341/77

[51] Int. Cl.³ ................................................ F03D 7/04
[52] U.S. Cl. ............................... 416/11; 416/132 B
[58] Field of Search .................... 416/9, 11, 132 B

[56] References Cited

U.S. PATENT DOCUMENTS

| 625,614 | 5/1899 | Thompson | 416/194 X |
|---|---|---|---|
| 756,616 | 4/1904 | Fornander | 416/9 |
| 1,015,416 | 1/1912 | Bennett | 416/194 X |
| 2,214,677 | 9/1940 | North | 415/72 X |
| 2,465,285 | 3/1949 | Schwickerath | 416/9 X |
| 2,484,291 | 10/1949 | Hays | 416/11 X |

FOREIGN PATENT DOCUMENTS

| 158861 | 7/1952 | Australia | 416/11 |
|---|---|---|---|
| 907400 | 3/1954 | Fed. Rep. of Germany | 416/11 |
| 1078401 | 11/1954 | France | 416/9 |
| 40533 | 12/1957 | Poland | 416/11 |
| 158242 | 1/1963 | U.S.S.R. | 416/9 |

Primary Examiner—Everette A. Powell, Jr.
Attorney, Agent, or Firm—Fleit & Jacobson

[57] ABSTRACT

The invention relates to a windmill of the type having an elongated propeller shaft inclining upwardly away from the wind direction so that the height of the propeller above ground is substantially determined by the length of the shaft and its angle with the horizontal plane. The invention is based on the recognition that the wind load on the propeller is substantially acting as a longitudinal tensile strain in the shaft when its angle with the horizontal plane is within a certain angle range, and according to the invention it is therefore sufficient to support the shaft by a simple staying device via a bearing. One end of the staying device may be attached solely to the non-rotating part of the bearing, resulting in the achievement of an inexpensive and light construction having a relatively thin shaft.

7 Claims, 2 Drawing Figures

WINDMILL

The present invention relates to a windmill of the type which has a set of propellers attached at the free upper end of an inclined shaft whose other end is journalled in a bearing fitted on a pedestal.

Aeromotors are generally classified in types with horizontal propeller shaft mounted at the top of a tower, said type being in recent time the one must used, and types with vertical propeller shaft, of which may be mentioned Savonius and Darreius aeromotors. It is characteristic of types with horizontal propeller shaft that they must be mounted so as to allow the propeller assembly to rotate about a vertical shaft in order to be able to adapt to changing wind directions, whereas such a rotating or swaying system is not required in aeromotors with vertical shaft.

The reason why aeromotors of the propeller type are mounted on the top of a tower or a mast, whose height may typically be two or three times greater than the diameter of the rotor, is that the wind speed even over flat ground increases with the height above ground. This is especially of importance because the effect generated by the propeller within its effective working range increases by the cube of the wind speed. The often very high tower must be heavily dimensioned and solidly anchored, not so much because of the weight of the components positioned on the top of the tower, such as propeller assembly, gear and swaying mechanism, but mostly because the horizontal force affecting tower and propeller in high wind may assume extremely high values. For an aeromotor with a propeller diameter of 8 meters there has been measured an axial force of 1300 kp at a wind speed of 25 m/sec or 26 kp per m$^2$ swept area. As from time to time the wind speed may increase to 40 to 45 m/sec the construction must for reasons of security be dimensioned for even bigger axial forces typically from 50 to 100 kp/m$^2$. By way of example this means that if the rotor diameter is 25 m and the tower height is 50 m the tower and its base must be capable of withstanding a bending moment of 1200 to 2400 ton-meters at the foot. Almost irrespective of the chosen construction such a tower will per se be a big and expensive edifice, and the costs of such a tower often amount to more than half of the total construction costs.

The expression "with horizontal shaft" should not be taken at its face value because the rotor shaft on aeromotors of this class is often slightly inclined with respect to the horizontal—typically of the order of 5° to 15°. The purpose of this is to provide a safe distance to the tips of the rotor blades where they swing past the tower which is often formed as a tripod construction or as a central mast braced with a stay anchored at a suitable distance from the heel of the mast.

The German Pat. No. 907 400 discloses a windmill having a shaft positioned so steeply that the height of the propellers above ground substantially depends upon the length of the shaft. This known windmill has the advantage that the shaft may be lowered so that the propellers may be inspected without the use of cranes, but suffers from the serious drawback that the moment of inertia of the shaft must be large in order that the shaft protruding freely according to the wind direction does not bend down or vibrate during rotation. The transverse dimension of the shaft must therefore be large, which entails finally that the bearing supporting the shaft is extremely expensive, though not impossible to manufacture for large windmills, and secondly the thick shaft entails much wind shadow with eddies reducing the efficiency of the propellers and giving rise to noise. Apart from these drawbacks this construction has the advantage that it does not require an expensive tower since the tower height is relatively small.

A further factor to be considered when the shaft is inclined is that the plane of the propellers is also inclined with respect to the wind direction, whereby its effective area is reduced. The consequent loss in obtained energy may be compensated by using a relatively high speed rotor or propeller because the wind force on a propeller blade depends upon the relative wind direction. By viewing a propeller blade horizontally disposed it will be understood that the relative wind direction is only little depending on the true wind direction when the rotor blade moves relatively fast transversely to the wind. In respect of propeller assembly of said high speed type it is, for the reasons mentioned above, especially important that the wind current is free of eddies before it attacks the propeller blades.

The object of the invention is to provide an aeromotor or a windmill having an inclined shaft, which windmill is inexpensive to produce and gives rise to as little wind shadow and formation of eddies as at all possible so that compared with known windmills there is obtained a considerably cheaper construction for a given useful effect.

This object is achieved in that the windmill is provided with a staying device connected between an upwardly extending frame attached to the pedestal and the non-rotating part of a bearing on the shaft for affecting the shaft with a moment which is oppositely directed and substantially corresponds to the bending moment caused by the weight of the shaft and the propellers on the shaft at its other end, said shaft being inclined with respect to the wind direction so that the resultant of the wind impact on the propellers is substantially a tensile force in the direction of the shaft.

The invention is based on the new recognition that the resulting wind force impact on the propellers is substantially a tensile force in the longitudinal direction of the shaft when the shaft inclines between 25° and 35° with respect to the wind direction so that the bending moment in the shaft is substantially constant and only depends upon the weight of the shaft and the propellers and upon the constant angle of inclination, which is within the said angle range. In recognition of these uniform conditions of load the bending moment in the shaft may be counteracted by the staying device according to the invention, whereby the cross sectional diameter of the shaft may be reduced considerably to diminish the wind shadow effect and/or elongated so that the propellers will be positioned higher above ground than is known from other constructions. As a consequence of its simplicity the staying device is inexpensive and produces practially no wind shadow.

At a preferred angle of inclination of the shaft with respect to the horizontal plane the tensile force in the staying device is—apart from being substantially constant—of such an order that the non-rotating part of the bearing only pivots a small, permissible angle around the shaft as a consequence of rotation. If the staying device only comprises a single stay, it may be attached to a fork whose prongs are connected to the outer ring in diametrically opposite points. The staying device may also comprise two stays attached to their respective sides of the outer ring.

In practice the staying device is constructed so as to affect the bearing with a force having an inclined effect with respect to the shaft. The bearing is therefore preferably adapted to take up forces in the longitudinal direction of the shaft as well as transversely to this direction.

By extending the staying device from the frame to the free end of an arm provided with a counterweight, which arm is attached to the pedestal and protrudes therefrom in a direction substantially opposite the shaft, it is achieved that the members attached to the pedestal, primarily the shaft, propellers and counterweight are in static equilibrium so that the underframe is only to take up the moment stemming from the tension of the wind force in the shaft, for which reason the underframe may be made thinner so as to reduce the construction costs and the wind shadow effect.

Figure 2:
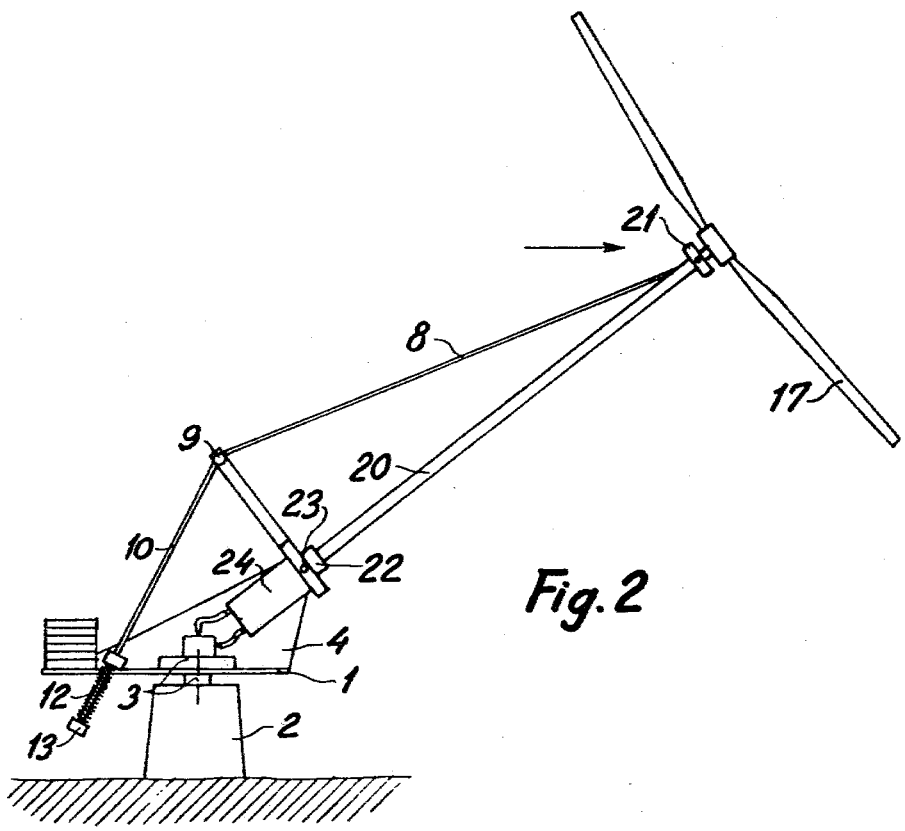

The invention will be explained in greater detail in the following description of an embodiment with reference to the drawing, in which FIG. 1 illustrates the basis on which the invention builds, and FIG. 2 shows an embodiment of the windmill according to the invention.

Referring to FIG. 1 the new recognition on which the invention is based will be explained first. The figure comprises curves I and II setting forth the bending moment in a point O, stemming from two windmill constructions I and II, respectively. The curve I expresses the bending moment h' multiplied by the force $P_y$ stemming from the wind pressure against the propellers of the windmill I. From this it can be seen for example that a propeller set of an area of 26 m² gives a bending moment in the point O of 403 kpm when the wind speed is 12 m/sec. It appears from this that the towers of big windmills must be very heavily dimensioned as was explained in the preamble of the specification. In windmill II the moment was measured with an arm a, and the measurement results are stated at the bottom of FIG. 1 for three different angles of inclination $\alpha=25°$, 30° and 35° of the shaft. It will be seen that the measurement results are distributed around O, the explanation of which is that besides being affected by the wind force $P_y$ the propeller set is also affected by a vertical force $P_o$ so that the vector sum of $P_y$ and $P_o$, termed r, intersects or is adjacent the point O, so that a is zero or small. The lift force $P_o$ is brought about by the inclined position of the propeller set with respect to the wind direction so that the propeller set functions as a kite. The lift effect depends to some extent upon the rotational speed of the propellers, which explains the spreading of the measurement results indicated by hatching, since it takes a certain time for the speed of the propellers to increase during a gust of wind. It appears, however, from the figure that this phenomenon only gives rise to moments which are many times smaller than the moment produced in windmill I.

In FIG. 2 there is shown an embodiment of the windmill according to the invention, which is based on the windmill II of FIG. 1. The windmill comprises a propeller set 17 attached to a shaft 20 extending downwardly towards and is secured to a pedestal 1. The pedestal 1 is mounted so as to pivot freely around a vertical axis on the top of a frame or base 2 and is provided in a manner known per se with bearing for taking up axial and radial loads as well as a moderate bending moment acting perpendicularly to the axis. The pedestal 1 is provided with side members 4 carrying a horizontal shaft 23 serving as a bearing for a water brake 24 in communication with the shaft 20 for converting rotatory energy directly into heat. Further, there is provided a bearing 22 which is attached to the pedestal, for the shaft 20 which at the other end adjacent the propeller set 17 of the invention is also supported by a bearing 21 having an outer ring connected to a stay 8 extending down to one end of a support 9 whose other end rests (in the shown embodiment via the bearing 23) on the pedestal 1. Another stay 10 or the elongation of the stay 8 extends from point 9 through a hole in the centre of a beam 11 positioned adjacent the end of the pedestal facing the wind direction, and extends below the beam 11 through a heavy pressure spring 12 and is provided with an adjustment nut 13. In front of the beam 11 there is provided a counterweight 7 for statically balancing the weight of the rotor, the shaft, and the propellers, etc. It will be understood that the shaft 20 may in a manner known per se be placed through the centre of gravity of the entire construction comprising the pedestal 1 and the counterweight 7, so that the construction may be swung downwardly for inspection of the propellers.

During wind impacts the propeller set acts as a vane swinging the entire construction around the swaying shaft when the wind direction, indicated by the arrow V, changes, and the wind attacks the inclined rotor area, causing the windmill to rotate. When the windmill works the wind force affects the rotor area in the manner described in connection with FIG. 1, and the angle of inclination of the shaft 20 may now be adapted by means of the adjustment nut 13 so that the force of the wind against the rotor area is taken-up as a longitudinal tensile stress on the shaft 20 and is transferred through this to the swaying bearing, which is mounted with its centre in a line marking the elongation of the shaft. The small variations from the position of equilibrium, caused by sudden gusts of wind are taken up by the pressure spring 12, but could also be taken up solely by the elasticity of the stays 8 and 10.

The force to be transferred by the stay 8 from the bearing 21 to the support 9 thus substantially depends upon the wind force, and the force is in reality a substantially constant tension stemming from the weight of the shaft and the propellers. This entails that the force may be transferred by a thin stay 8 which practically does not give rise to the wind shadow which has previously been described as a great disadvantage for windmills. The stay 8 is attached to the bearing 21 by means of a fork whose prongs are secured to diametrically opposite bearing pins in an outer ring of the bearing 21. This is a very simple and inexpensive construction which is feasible because the substantially constant tension in the stay 8 ensures that the outer ring with the fork can only pivot a small, permissible angle as a consequence of friction between the outer ring and the shaft. The shaft 20 is also inexpensive to produce since it consists of a thinwalled pipe of a diameter sufficient to obtain a necessary moment of inertia. The wind shadow from the shaft is small as it is not required that the moment of inertia shall be big when the shaft is supported adjacent the propeller set, and besides, the wind attacks the round shaft at an inclined angle so that the wind runs around an elliptic body, which practically does not give rise to eddies.

What I claim is:

1. A windmill comprising:
an inclined shaft;

a set of propellers attached to an upper free end of said shaft, a first bearing rotatably supporting a lower end portion of said shaft, a pedestal supporting said first bearing, a second bearing rotatably supporting an upper portion of said shaft, said second bearing having a non-rotating portion surrounding said shaft, a staying device spaced from and positioned above said shaft, said staying device extending between said pedestal and said non-rotating portion of said second bearing and affecting the shaft with a moment which is oppositely directed and substantially corresponds to the bending moment created by the weight of the shaft and the propellers on the shaft at its other end, said shaft being inclined with respect to the wind direction so that the resultant of the wind impact on the propellers is substantially a tensile force in the direction of the shaft.

2. A windmill according to claim 1, characterized in that said second bearing is a ball bearing adapted to take up radial as well as axial load, the non-rotating portion of said second bearing comprising an outer ring attached only to the staying device.

3. A windmill according to claim 1, wherein said staying device comprises:

inclined support means connected to and extending upwardly from said pedestal and facing into the wind when said shaft faces down wind, first means extending from the non-rotating portion of said first bearing to an upper portion of said inclined support and having end portions thereof operatively connected to said non-rotating portion and said upper portion, and second means extending from an upper portion of said inclined support to said pedestal, a first end portion of said second means being operatively connected to said upper portion and a second end portion being adjustably connected to a portion of the pedestal positioned upwind of the set of propellers so that the force exerted on the shaft by the staying device is adjustable.

4. A windmill according to claim 1, characterized in that sid second bearing is a roller bearing adapted to take up radial as well as axial load, the non-rotating portion of said second bearing cmprising an outer ring attached only to the staying device.

5. A windmill according to claim 2, 1 or 4, further comprising an underframe secured to a bottom portion of said pedestal in such manner that said pedestal is pivotable about a vertical axis, and an upwardly extending frame attached to said pedestal, said staying device having a first stay extending from an upper portion of said frame to said non-rotating part of said second bearing, and a second stay extending from the upper portion of said frame to said pedestal, the second stay protruding beneath the pedestal in a direction substantially opposite the upward direction of the inclined shaft.

6. A windmill according to claim 5, further comprising a counterweight exerting a force on said second stay opposing the weight of said inclined shaft and said propellers.

7. A windmill according to claim 1, wherein said staying device further comprises a fork having prongs secured to diametrically opposite portions of said non-rotating portion of said second bearing, and a support member extending between the connected to said fork and said pedestal.

* * * * *

UNITED STATES PATENT AND TRADEMARK OFFICE
CERTIFICATE OF CORRECTION

PATENT NO. : 4,242,043
DATED : December 30, 1980
INVENTOR(S) : PEDER U. POULSEN

It is certified that error appears in the above—identified patent and that said Letters Patent is hereby corrected as shown below:

On the title page, change

-- (30) Foreign Application Priority Data

Jul. 25, 1977 [DK] Denmark....................3341/77--

Signed and Sealed this

Twenty-third Day of November 1982

[SEAL]

Attest:

GERALD J. MOSSINGHOFF

Attesting Officer     Commissioner of Patents and Trademarks